United States Patent

[11] 3,626,146

| [72] | Inventor | Colin Francis Greening Smith<br>Chandlers Ford, England |
|---|---|---|
| [21] | Appl. No. | 848,274 |
| [22] | Filed | Aug. 7, 1969 |
| [45] | Patented | Dec. 7, 1971 |
| [73] | Assignee | International Standard Electric<br>Corporation<br>New York, N.Y. |
| [32] | Priority | Aug. 28, 1968 |
| [33] | | Great Britain |
| [31] | | 41,145/68 |

[54] WELD CURRENT CONTROLLER
7 Claims, 1 Drawing Fig.

[52] U.S. Cl. .................................................. 219/131 R, 219/135
[51] Int. Cl. .................................................. B23k 9/10
[50] Field of Search ........................................ 219/131, 135, 121, 60, 60.1

[56] References Cited
UNITED STATES PATENTS

| 2,464,402 | 3/1949 | Kentis, Jr. ...................... | 219/135 |
| 2,951,972 | 9/1960 | Pomazal ......................... | 219/131 X |
| 3,123,705 | 3/1964 | Logan ............................. | 219/131 |
| 3,133,225 | 5/1964 | Lobosco et al. ................ | 219/131 X |
| 3,261,960 | 7/1966 | Lehnert .......................... | 219/131 X |
| 3,286,074 | 11/1966 | Lehnert et al. ................. | 219/131 |
| 3,299,250 | 1/1967 | Vilkas et al. ................... | 219/130 |
| 3,435,187 | 3/1969 | Sciaky ............................ | 219/135 |

*Primary Examiner*—J. V. Truhe
*Assistant Examiner*—George A. Montanye
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: An arc welding current control system establishes predetermined operating current levels during deenergized, starting and running conditions. Switching circuits provide signals to a servoamplifier which drives a motor and potentiometer to control the current to a weld current power source. Changes from the desired level are detected and compensated for. A protective circuit automatically reduces the current level when the welding arc is off and provides an operating current only when the arc is on.

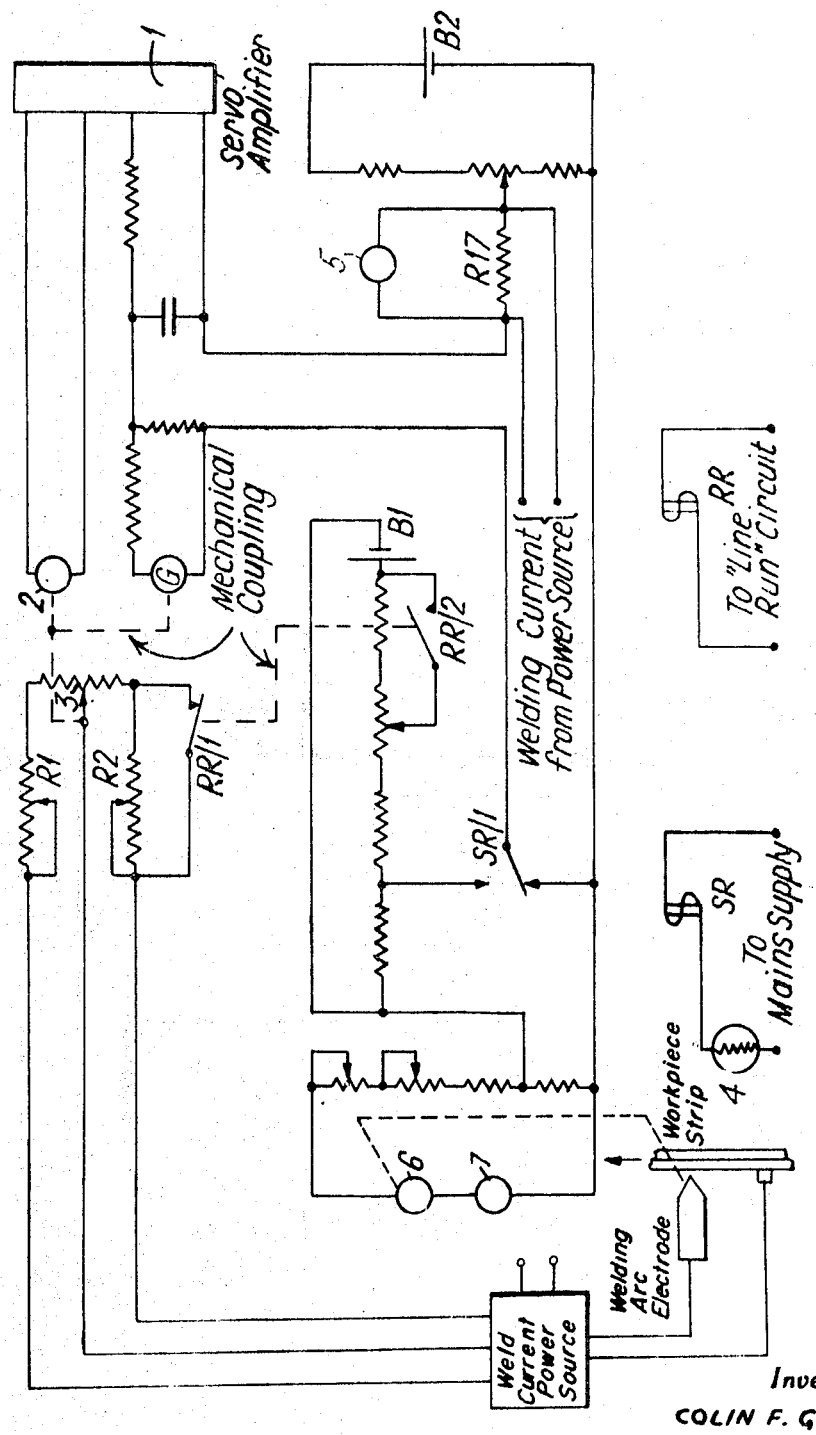
Inventor
COLIN F. G. SMITH
By Edward Goldberg
Attorney

WELD CURRENT CONTROLLER

BACKGROUND OF THE INVENTION

1. Field of the Invention

This invention relates to weld current servocontrol systems for use when arc welding two edges of strip material together on a production line, and in particular to closed loop systems.

2. Description of the Prior Art

Known forms of controllers are of the open loop type and are subject to various faults. The consistency of welding performance is dependent on the stability of every component in the loop, including the arc length and contamination. The weld current is dependent on the mains or power supply voltage and is therefore very susceptible to variation in the latter, but it has been found that mains voltage stabilizers do not completely eliminate these variations. In order to maintain the required resolution at the low-current end of the range, specially wound nonlinear weld current potentiometers are needed. These potentiometers are specially designed for use with only one type and thickness of material, hence if a change of material and/or thickness is required a suitable potentiometer must be inserted in the circuit in place of the existing one.

A weld current control system should ideally satisfy the following requirements. Prior to starting the line the arc must be struck and held at a stable low current, which current must be surge free, to avoid damage to the strip material, and repeatable. The line start button should be so arranged that, on pressing it, the weld current increases before the strip material starts to move, thus producing a fault-free weld over the start area once again this current must be surge free and repeatable. The control system must reliably provide the correct welding current throughout the machine speed range, particularly during the acceleration and deceleration periods and when stopping the line, in order that no weld skip or gap is produced. These requirements must be met independently of mains voltage variations and it must be possible to set the standing and starting current values independently of the running current value and adjust all these current values to suit changes of material type and/or thickness in a simple manner. It should also be possible to produce a nonlinear weld current/speed characteristic should the process demand it.

SUMMARY OF THE INVENTION

It is the object of the invention to fulfil these requirements and accordingly there is provided a closed loop weld current servocontrol system for use in association with a production line for arc welding two edges of strip material together, comprising a servoamplifier and associated servomotor, which motor is controlled by signals received by the amplifier from control and protection circuits, and is arranged to move the moving contact of the weld current control potentiometer in order to adjust the weld current successively to the standing, starting and welding values required for the type and thickness of strip material being used, and also to reverse the sequence for use when stopping the line.

The invention will now be described with reference to the manufacture of tubes from one piece of strip material, this is not to be regarded as a restriction on the scope of the invention, and also with reference to the accompanying drawing.

BRIEF DESCRIPTION OF THE DRAWING

The FIGURE shows a schematic diagram of the novel control circuit.

DESCRIPTION OF THE PREFERRED EMBODIMENT

Before the arc is struck, relay contacts SR/1 and RR/2, illustrated in the FIGURE, are deenergized by switching them to the positions shown. As a result the servoamplifier 1 receives a bias signal from the circuit including a direct current source B2 and resistor R17 such that the servomotor 2 drives the weld current control potentiometer 3 to the low-current end stop. To strike the arc, a high-frequency current is applied to ionize the arc gap (not shown) and the weld current power source is switched on. A direct current unit is assumed for this description, but with minor modifications to the control circuits and alternating current power source could be used. The resistors R1 and R2, connected to the weld current source, are present to provide an arc current less than the standing current required.

When the arc is struck the strike relay SR is energized by the photoconductive cell 4 viewing the arc to close contact SR/1 and cause the servoamplifier 1 to receive a bias signal from the circuit including direct current source B1 which in turn causes the servomotor 2 to drive the weld current control-potentiometer 3 up scale and provide a greater weld current. The increasing weld current causes a voltage to be developed across R17 (Ammeter 5 shunt) such that it balances out the difference between the B1 and B2 bias voltages. The servoamplifier 1 then has zero input voltage and the servomotor 2 stops the potentiometer 3 at the desired weld current value. Velocity feedback is derived from generator G. The high-frequency starting current is then switched off.

It is necessary to interlock the strike relay SR through the photoconductive cell 4 viewing the arc since, if the arc did not strike when the relay was "made," the control potentiometer 3 would be driven up scale continuously as no feedback would be obtained via R17. If the arc then struck, the high current produced would cause a major weld fault. This protection circuit is an important feature of the controller and improves the reliability over all other interlock methods. Should the arc extinguish at any time the weld current potentiometer 3 is automatically driven to its low-current end stop and contacts (not shown) shut down the line. The system can be operated without the photoconductive cell 4 provided that the strike relay is interlocked with the welding contactor switch and the high-frequency on/off switch such that the relay will only energize when the contactor switch is on and the high frequency is off. The system in this form is less satisfactory as overcurrent protection is not automatic, neither is protection automatic if the arc extinguishes during normal running.

On pressing the "line run" button (not shown) the run relay RR is energized, via suitable delay and drive contactor circuits. Contacts RR/2 close, thus increasing the bias voltage from the B1 circuit and increasing the weld current through potentiometer 3, as previously described. If a large step is required additional contacts RR/1 can be used. As the welded product accelerates, a permanent magnet tachogenerator 6 driven by the product superimposes a voltage on the B1 circuit causing the weld current to increase in proportion to the line speed. The weld current will stabilize at a value corresponding to any desired speed. Since the current demand and feedback circuits in the controller are independent of mains voltage, fluctuations of the latter affecting the welding power source and/or line speed are automatically compensated.

When stopping the line, the weld current falls proportionately with the line speed and as the product stops, contacts in the drive circuit cause the relay RR to deenergize and open contact RR/2, reducing the weld current to the standing value. This current is then switched off manually and the potentiometer 3 automatically returns to the zero position.

A function generator 7 can be connected in series or parallel with the tachogenerator circuit in order to produce a nonlinear weld current speed characteristic should the process demand it.

What is claimed is

1. A closed loop weld current servocontrol system for use in association with a production line for arc welding two edges of strip material together, comprising a movable workpiece of strip material, a welding arc electrode positioned adjacent said workpiece to provide a welding arc, a servoamplifier and associated servomotor driven by said amplifier, a weld current power source supplying welding arc current to said electrode to establish said arc and for welding said workpiece, first bias means connected to said amplifier for establishing a predetermined standing current level, second bias means for establishing a predetermined starting current level, switching means for connecting said second bias means to said amplifier upon the striking of said welding arc, said first and second bias means applying signals representative of said current levels to said amplifier, a weld current potentiometer connected to said weld current source to adjust the weld current of said source to said predetermined levels, means connecting said servomotor to said weld current potentiometer to control the current through said potentiometer in accordance with said signals from said amplifier, and current sensing means connected to said weld current source and to said amplifier for sensing changes in said weld current source from said levels and for balancing out said changes to maintain said levels.

2. The system of claim 1 including protective circuit means for detecting the on and off conditions of the welding arc and operating said switching means to connect said second bias means and establish said starting current level only when the arc is on and to automatically reduce said starting current level when the arc is off.

3. The system of claim 2 including means driven by and sensing the speed of movement of said workpiece past the arc to automatically adjust the arc current to a corresponding level.

4. The system of claim 2 wherein said protective circuit means includes a light-sensitive device viewing the arc, and a relay connected in series with and actuated by said light-sensitive device to operate said switching means.

5. The system of claim 2 wherein said first and second bias means establish said standing and starting current levels independently of the welding current and including means for adjusting said levels for different characteristics of the workpiece material.

6. The system of claim 3 wherein said second bias means includes a function generator connected to said speed sensing means to provide nonlinear weld current/speed characteristics.

7. The system of claim 2 wherein said means for sensing current changes includes a resistor connected to said weld current source and between said first bias means and said amplifier for balancing out differences between said first and second bias means.

* * * * *